United States Patent
Wilks et al.

(10) Patent No.: US 6,944,757 B2
(45) Date of Patent: Sep. 13, 2005

(54) METHOD FOR ALLOWING CD REMOVAL WHEN BOOTING EMBEDDED OS FROM A CD-ROM DEVICE

(75) Inventors: Andrew W. Wilks, Austin, TX (US); Richard R. Lee, Framingham, MA (US)

(73) Assignee: Dell Products L.P., Round Rock, TX (US)

( * ) Notice: Subject to any disclaimer, the term of this patent is extended or adjusted under 35 U.S.C. 154(b) by 638 days.

(21) Appl. No.: 09/978,494

(22) Filed: Oct. 16, 2001

(65) Prior Publication Data

US 2003/0074550 A1 Apr. 17, 2003

(51) Int. Cl.⁷ .......................... G06F 9/24; G06F 9/445
(52) U.S. Cl. .................... 713/2; 713/1; 713/100
(58) Field of Search .................. 713/1, 2, 100

(56) References Cited

U.S. PATENT DOCUMENTS

| | | | |
|---|---|---|---|
| 5,261,104 A | * 11/1993 | Bertram et al. | 713/1 |
| 6,101,601 A | * 8/2000 | Matthews et al. | 713/2 |
| 6,279,109 B1 | 8/2001 | Brundridge | 713/2 |
| 6,804,774 B1 | * 10/2004 | Larvoire et al. | 713/2 |
| 2002/0194394 A1 | * 12/2002 | Chan | 709/319 |

FOREIGN PATENT DOCUMENTS

JP 08179937 A * 7/1996 .......... G06F/9/06

OTHER PUBLICATIONS

Stuckelbert et al, Linux Remote–Boot mini–HOWTO:, v3.19, Feb. 1999, pp. 42.*
Stevens, Curtis E., El Torito Bootable CD–ROM Format Specification, Version 1.0, Jan. 15, 1995, Phoenix Technologies and Stan Merkin, IBM Corporation (20 pages).

* cited by examiner

*Primary Examiner*—Thomas Lee
*Assistant Examiner*—Mark Connolly
(74) *Attorney, Agent, or Firm*—Haynes and Boone, LLP

(57) ABSTRACT

A method and system for enabling removal of a removable medium of a boot device included in a computer system when booting a boot operating system. A boot device driver program, included in the boot operating system, is executed to configure a RAM disk. The boot device driver program copies the contents of the boot sector of the removable medium to the RAM disk. The boot device driver program modifies the boot operating system by redirecting the boot media input/output to the RAM disk. The redirection of the boot media I/O to the RAM disk enables the removal of the removable medium.

24 Claims, 3 Drawing Sheets

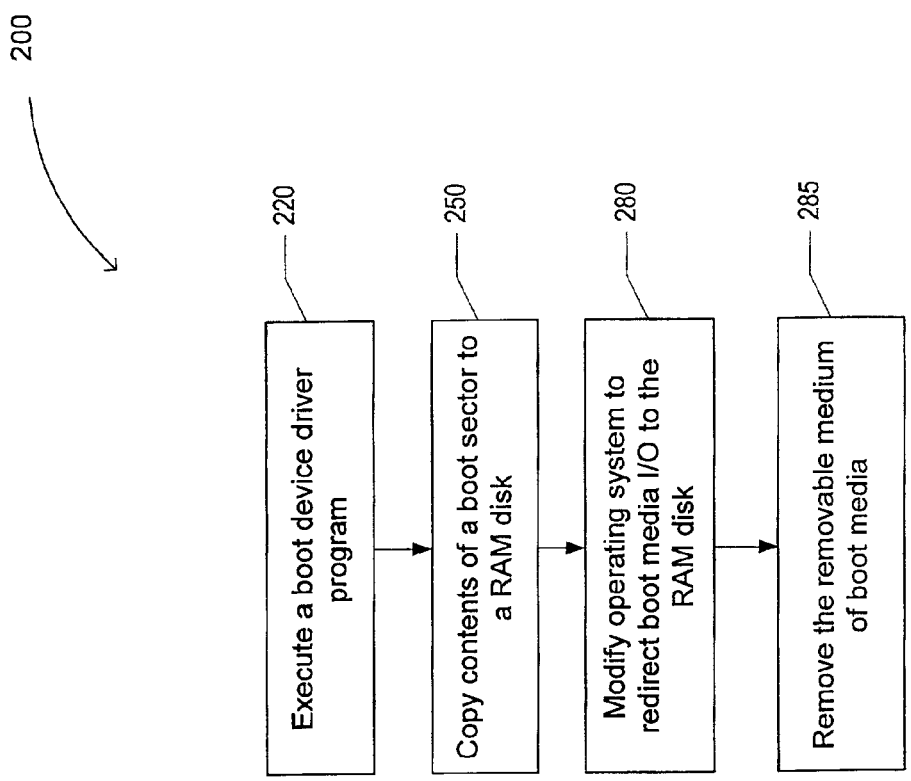

METHOD FOR ALLOWING CD REMOVAL WHEN BOOTING EMBEDDED OS FROM A CD-ROM DEVICE

BACKGROUND

The present disclosure relates to computer systems. More specifically, the present disclosure relates to enabling removal of the removable medium of a boot device included in a computer system when booting an embedded operating system from a read only media.

Personal computer ("PC") systems in general and IBM compatible computer systems in particular have attained widespread use. These computer systems handle information and primarily give independent computing power to a single user (or a relatively small group of users in the case of a PC network). Such computer systems are generally inexpensively priced for purchase by individuals or small businesses and provide computing power to many segments of today's modem society.

A computer system can usually be defined as a desktop, floor-standing, or portable microcomputer that includes a system unit having a central processing unit ("processor"), volatile and/or non-volatile memory, a display monitor, a keyboard, one or more floppy diskette drives, a hard disk storage device, an optional DVD or CD-ROM drive, and an optional printer. A computer system typically includes an operating system ("OS"), such as Microsoft Windows NT™, NetWare® or Linux. A computer system may also include one or a plurality of peripheral devices such as input/output ("I/O") devices coupled to the system processor to perform specialized functions. Examples of I/O devices include keyboard interfaces with keyboard controllers, floppy diskette drive controllers, modems, sound and video devices, specialized communication devices, and even other computer systems communicating with each other via a network. These I/O devices are typically plugged into connectors of computer system I/O interfaces such as serial interfaces and parallel interfaces, for example. Generally, these computer systems use a system board or motherboard to electrically interconnect these devices.

Computer systems also typically include basic input/output system ("BIOS") programs to ease programmer/user interaction with the computer system devices. More specifically, BIOS provides a software interface between the system hardware and the operating system/application program.

Although the processor provides the "kernel" of the computer system, I/O communication between an I/O device and the processor provides a basic feature of computer systems. Many I/O devices include specialized hardware working in conjunction with OS specific device drivers and BIOS routines, e.g., CD-ROM BIOS, to perform functions such as information transfer between the processor and external devices, such as modems and printers, coupled to I/O devices.

Computer system manufacturers may typically load the preferred operating system before shipping the computer system to the customer. Some customers may prefer to modify the loaded operating system or purchase and load their own preferred operating system. To load the selected operating system onto the hard disk for the first time or to change the preferred operating system, the PC user typically uses a boot device to initially boot up the computer system. A boot device may typically include a removable media such as a floppy disk or a CD-ROM. For example, a bootable CD-ROM compliant with the "El Torito" specification (described below) may be used to boot the computer system. The boot CD-ROM typically includes a boot sector, which includes a system image of the boot operating system. The boot floppy disk or the boot CD-ROM may also include a utility to install a preferred operating system on to the hard disk drive. Each type of operating system selected, e.g., Windows ME™, Windows 2000™ or Linux, may have its own CD. Bootable CD's are available for Windows NT, Windows 2000™, Windows XP or Linux.

The El Torito Bootable CD-ROM Format Specification, Version 1.0, Jan. 15, 1995, Curtis E. Stevens, Phoenix Technologies and Stan Merkin, IBM Corporation, supports a floppy disk emulation format, a hard disk emulation format or a "no emulation" for the CD boot image. When the CD boot image is in a floppy disk emulation format, the CD becomes drive 00, the former drive 00 moves to 01 and all other drive identifiers remain intact. This means that the computer system always has a usable floppy drive. All hard disk drive letters are maintained so that a CD can boot and then install software on the hard disk. The floppy remains accessible as drive 01 to allow software updates via supplemental floppies. When the CD boot image is in a hard disk emulation format, all drives numbered 80 and above are incremented by 1. The CD will become drive 80. This allows software vendors to create stand-alone CD's, without regard to the hard disk drives. The computer systems hard drive remains accessible because the stand alone CD may need temporary disk storage. When the CD boot image is simply a loader or stand alone program and no emulation is desired then the drive numbers will be unaffected after the boot image is loaded.

U.S. Pat. No. 6,279,109 issued Aug. 21, 2001, "Computing System And Operating Method For Booting And Running A Graphical User Interface (GUI) With R/W Hard Drive Partition Unavailable", Michael Brundridge, describes a system and a method of booting and executing a graphical user interface with R/W hard drive partition unavailable. The application describes using the CD boot image in a floppy disk emulation format, as described in the El Torito specification. The application also describes creating a RAM disk using a MS-DOS floppy image, and a Win95 image stored on the ISO 9660 track of the boot CD in zip file format. The size of the RAM disk is fixed.

Traditionally, a CD boot image in a hard disk emulation format is used to provide a large MS-DOS compatible storage space for application programs. This it typically most suitable for stand alone applications which do not require full system resources. Booting the CD as a hard disk normally requires that all applications on the CD are MS-DOS based.

A backing store is a storage medium, such as a disk or memory. When the CD is booted in a hard disk emulation format, the boot device media, e.g., the CD-ROM, is typically used as the backing store. This results in locking up the boot media, e.g., the CD-ROM, so as to provide protection against the occurrences of memory page faults. When the CD-ROM volume locks up due to backing store, changing the CD-ROM volume to load a preferred operating system becomes difficult. It would be desirable to use the CD boot image in a hard disk emulation format to load a preferred operating system without the boot media being locked up due to backing store restrictions.

The following is hereby incorporated by reference: 1) U.S. Pat. No. 6,279,109 issued Aug. 21, 2001, "Computing System And Operating Method For Booting And Running A Graphical User Interface (GUI) With R/W Hard Drive Partition Unavailable", Michael Brundridge. 2) "El Torito" Bootable CD-ROM Format Specification, Version 1.0, Jan. 15, 1995, Curtis E. Stevens, Phoenix Technologies and Stan Merkin, IBM Corporation.

SUMMARY

It has been discovered that a method and system may be used for enabling removal of a removable medium of a boot device included in a computer system when booting a boot operating system. The method and system thereof for enabling removal of a removable medium of a boot device is described.

In one embodiment, a method for enabling removal of a removable medium of a boot device included in a computer system when booting a boot operating system includes executing a boot device driver program to configure a RAM disk. The boot device driver program is included in the boot operating system. The method also includes copying the contents of the boot sector of the removable medium to the RAM disk and modifying the boot operating system by using the boot device driver program to redirect the boot media input/output to the RAM disk. The redirection of the boot media I/O to the RAM disk enables the removal of the removable medium.

It would be desirable to use a non MS-DOS based boot operating system when the CD boot image is set to hard disk emulation. In one embodiment, the boot operating system is preferably a 32-bit operating system.

In one embodiment, a computer system to implement the method of enabling removal of a removable medium of a boot device of the computer system when booting a boot operating system is described. The computer system also includes a processor, a memory, and a boot device driver program executable by the boot operating system. The memory includes a RAM disk memory allocated to emulate a hard disk. On executing the boot device driver program the contents of the boot sector of the removable medium are copied to the RAM disk. The boot device driver program modifies the boot operating system by using the boot device driver program to redirect the boot media input/output to the RAM disk. The redirection of the boot media I/O to the RAM disk enables the removal of the removable medium.

In one embodiment, a computer-readable medium includes a computer program accessible therefrom. The computer program includes instructions for executing a boot device driver program, executable by a boot operating system. The boot operating system is loaded by the boot device during a boot of a computer system. The computer program also includes instructions for copying contents of a boot sector of a removable medium of the boot device to a RAM disk using the boot device driver program. The boot operating system and the boot device driver program are stored as an embedded image on the boot sector of the removable medium. The memory of the computer system includes the RAM disk memory allocated to emulate a hard disk. The computer program further includes instructions for modifying the boot operating system using the boot device driver program to redirect boot media I/O to the RAM disk. The memory based boot operating system enables the removal of the removable medium.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

FIG. 2A shows a flow chart for a method of enabling removal of a removable medium of a boot device included in the computer system when booting an embedded operating system.

DETAILED DESCRIPTION

The following description of the disclosure is intended to be illustrative only and not limiting.

Figure 1:
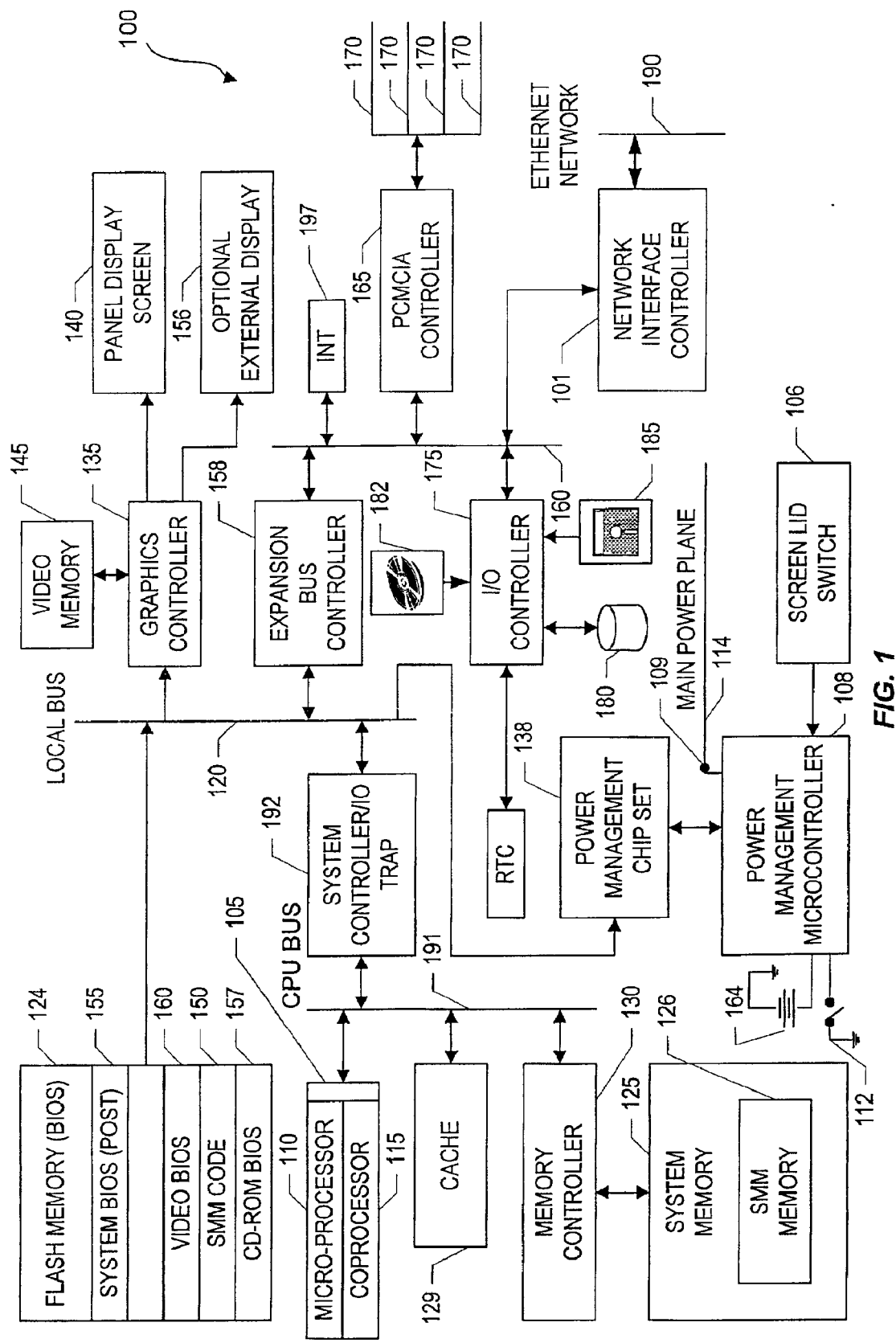
FIG. 1 illustrates a computer system, which includes a method of enabling removal of a removable medium of a boot device when booting an embedded operating system.

Referring to FIG. 1, a computer system 100 is shown that is suitable for implementing a method of enabling removal of a removable medium of a boot device included in the computer system 100 when booting an embedded operating system. The computer system 100 includes a processor ("processor") 105, for example, an Intel Pentium™ class microprocessor or an AMD Athlon™ class microprocessor, having a micro-processor 110 for handling integer operations and a coprocessor 115 for handling floating point operations. Processor 105 is coupled to cache 129 and memory controller 130 via processor bus 191. System controller I/O trap 192 couples processor bus 191 to local bus 120 and is generally characterized as part of a system controller such as a Pico Power Vesuvious or an Intel™ Mobile Triton chip set. System controller I/O trap 192 can be programmed in a well-known manner to intercept a particular target address or address range, and, upon intercepting a target address, system controller I/O trap 192 asserts an intercept signal indicating that processor 105 attempted to access the target address.

A main memory 125 of dynamic random access memory ("DRAM") modules is coupled to local bus 120 by a memory controller 130. Main memory 125 includes a system management mode memory area which is employed to store converter code to implement conversion methodology embodiments as will be discussed in more detail subsequently.

A (BIOS) memory 124 is coupled to local bus 120. A FLASH memory or other nonvolatile memory is used as BIOS memory 124. A BIOS program (not shown) is usually stored in the BIOS memory 124. The BIOS program includes CD-ROM BIOS 157 software for interaction with the computer system boot devices such as the CD-ROM 182. The BIOS memory 124 stores the system code which controls some computer system 100 operations.

A graphics controller 135 is coupled to local bus 120 and to a panel display screen 140. Graphics controller 135 is also coupled to a video memory 145 which stores information to be displayed on panel display 140. Panel display 140 is typically an active matrix or passive matrix liquid crystal display ("LCD") although other display technologies may be used as well. Graphics controller 135 can also be coupled to an optional external display or standalone monitor display. One graphics controller that can be employed as graphics controller 135 is the Western Digital WD90C14A graphics controller.

A bus interface controller or expansion bus controller 158 couples local bus 120 to an expansion bus 160. In this particular embodiment, expansion bus 160 is an Industry Standard Architecture ("ISA") bus although other buses, for example, a Peripheral Component Interconnect ("PCI") bus, could also be used. A personal computer memory card international association ("PCMCIA") controller 165 is also coupled to expansion bus 160 as shown. PCMCIA controller 165 is coupled to a plurality of expansion slots 170 to receive PCMCIA expansion cards such as modems, fax cards, communications cards, and other input/output devices. Interrupt request generator 197 is also coupled to ISA bus 160 and issues an interrupt service request over a predetermined interrupt request line after receiving a request to issue interrupt instruction from processor 105.

An I/O controller 175, often referred to as a super I/O controller is coupled to ISA bus 160. I/O controller 175 interfaces to an integrated drive electronics ("IDE") hard drive 180, a CD-ROM drive 182 and a floppy drive 185. An optional network interface controller 101 enables the computer system 100 to communicate with a computer network such as an Ethernet 190. The computer network may include a network such as a local area network ("LAN"), wide area network ("WAN"), Internet, Intranet, wireless broadband or the like. The network interface controller 101 forms a network interface for communicating with other computer systems (not shown) connected to the Ethernet 190 for implementing a method of enabling removal of a removable medium of a boot device included in the computer system 100 that is connected to the network of other computer systems. The computer system's networking components generally include hardware as well as software components. Examples of the hardware components include the network interface controller 101 and the Ethernet 190. Examples of the software components, which include messaging services and network administration services, are described below.

The computer system 100 serves as a controller for resolving proprietary and standard event and message structures into a common format for use by the computer network for many management purposes. The computer system 100 is connected with a plurality of computer systems in the network for receiving messages from the computer systems, analyzing the messages and determine an effective utilization of the messages as directed by a user or network administrator. The computer system 100 receives messages in different message formats, organizes the messages, and converts the messages into a common format that assists a user, system administrator, or network administrator in utilizing the information contained in the messages. The converted messages in a common format are distributed at the discretion of a user, network administrator, or system administrator based on user needs or message importance to other system administration applications via a selected communication method. The network administrator controls the type of messages that are communicated over the network. The computer system 100 supports the conversion of messages into the common format to facilitate particular network applications.

Computer system 100 includes a power supply 164, for example, a battery, which provides power to the many devices which form computer system 100. Power supply 164 is typically a rechargeable battery, such as a nickel metal hydride ("NiMH") or lithium ion battery, when computer system 100 is embodied as a portable or notebook computer. Power supply 164 is coupled to a power management microcontroller 108 which controls the distribution of power from power supply 164. More specifically, microcontroller 108 includes a power output 109 coupled to the main power plane 114 which supplies power to processor 105. Power microcontroller 108 is also coupled to a power plane (not shown) which supplies power to panel display 140. In this particular embodiment, power control microcontroller 108 is a Motorola 6805 microcontroller. Microcontroller 108 monitors the charge level of power supply 164 to determine when to charge and when not to charge battery 164. Microcontroller 108 is coupled to a main power switch 111 which the user actuates to turn the computer system 100 on and off. While microcontroller 108 powers down other portions of computer system 100 such as hard drive 180 when not in use to conserve power, microcontroller 108 itself is always coupled to a source of energy, namely power supply 164.

In a portable embodiment, computer system 100 also includes a screen lid switch 106 or indicator 106 which provides an indication of when panel display 140 is in the open position and an indication of when panel display 140 is in the closed position. It is noted that panel display 140 is generally located in the same location in the lid of the computer as is typical for "clamshell" types of portable computers such as laptop or notebook computers. In this manner, the display screen forms an integral part of the lid of the computer which swings from an open position for interaction with the user to a close position.

Computer system 100 also includes a power management chip set 138, which includes power management chip models PT86C511 and PT86C511 manufactured by Pico Power. Power management chip set 138 is coupled to processor 105 via local bus 120 so that power management chip set 138 can receive power control commands from processor 105. Power management chip set 138 is connected to a plurality of individual power planes which supply power to respective devices in computer system 100 such as hard drive 180 and floppy drive 185, for example. In this manner, power management chip set 138 acts under the direction of processor 105 to control the power to the various power planes and devices of the computer. A real time clock ("RTC") 140 is coupled to I/O controller 175 and power management chip set 138 such that time events or alarms can be transmitted to power management chip set 138. Real time clock 140 can be programmed to generate an alarm signal at a predetermined time.

When computer system 100 is turned on or powered up, the computer system 100 enters a start up phase, also referred to as a boot up phase, during which the computer system hardware is detected and the operating system is loaded. In case of a computer system 100 with the Windows NT operating system, the boot up process is typically divided into three stages. The initial two boot stages pertain to start up of the system components of the computer system 100 and the third stage typically pertains to the boot up of networking components of the computer system 100.

During the initial two boot stages, the computer system BIOS software stored in non-volatile BIOS memory 124 is copied into main memory 125 so that it can be executed more quickly. This technique is referred to as "shadowing" or "shadow RAM" as discussed above. At this time, system management mode ("SMM") code 150 is copied into the system management mode memory area 126 of main memory 125. Processor 105 executes SMM code 150 after processor 105 receives a system management interrupt ("SMI") which causes the microprocessor to enter SMM. Additional conditions under which an SMI is generated are discussed subsequently. It is noted that along with SMM code 150, also stored in BIOS memory 124 and copied into main memory 125 at power up are system BIOS 155 (including a power on self test module-POST), CD-ROM BIOS 157 and video BIOS 160. It will be recognized by those of ordinary skill in the art that other memory mapping schemes may be used. For example, SMM code 150 may be stored in fast SRAM memory (not shown) coupled to the local/processor bus 120.

The system BIOS 155 includes BIOS software for a boot device with removable media, e.g., CD-ROM BIOS 157 software configurable to boot load a CD-ROM 182 of the computer system, in accordance with the El Torito specification as described in further detail below.

In one embodiment, computer system 100 may be a server. The computer system 100 may be configured as a server to manage network resources. As is well known, several types of server configurations may be possible. For example, the computer system may be set up as a file server dedicated to storing files. Any user on the network may store files on the server. Other examples of servers include a print server, a web server and a database server. One example of a computer system 100 in a server configuration is the PowerEdge™ 6400 server manufactured by Dell Computer Corporation.

In one embodiment, the computer system 100 includes a computer-readable medium having a computer program or computer system 100 software accessible therefrom, the computer program including instructions for performing the method of enabling removal of a removable medium of a boot device included in a computer system when booting an embedded operating system. The computer-readable medium may typically include any of the following: a magnetic storage medium, including disk and tape storage medium; an optical storage medium, including compact disks such as CD-ROM, CD-RW, and DVD; a non-volatile memory storage medium; a volatile memory storage medium; and data transmission or communications medium including packets of electronic data, and electromagnetic or fiber optic waves modulated in accordance with the instructions.

Referring to FIG. 2A, a flow chart shows an embodiment of a method of enabling removal of a removable medium of a boot device included in a computer system when booting an embedded operating system, for use with a computer system 100 illustrated in FIG. 1. The method 200 may be practiced using manual techniques by entering commands to the computer system 100. Alternatively, the method 200 may be practiced through an executable program code such as through the operation of a command file or through the execution of any suitable programming code. In other embodiments, the method 200 may be performed by downloading or transferring of information and commands over a network such as an Ethernet 190 or other communication link.

The method 200 is particularly advantageous as applied in the Build-to-Order business method such as that practiced by Dell Computer Corporation. The personal computer business is rapidly moving toward "build-to-order" manufacturing. The customer typically enters a purchase order for a computer system by selecting specific options such as processor model/speed, memory size, hard disk size, peripheral devices such as CRT monitor size, resolution, keyboard, CD-RW, DVD, printers and others. The computer system purchase order usually includes the choice for a preferred operating system such as Windows ME™, Windows NT™, Windows 2000™ or in some cases Linux. The computer system manufacturer assembles the computer system hardware in compliance with the purchase order.

To load the selected operating system onto the hard disk 180 for the first time, the PC manufacturer typically uses a boot device to initially boot up the computer system 100. A boot device may typically include a floppy disk 185 or a CD-ROM 182. The PC manufacturer typically generates a bootable CD-ROM. The method 200 enables the bootable CD-ROM volume to be unlocked when booting in order to install the customers preferred operating system. The preferred operating system is typically available on another CD-ROM which is different than the bootable CD-ROM, e.g., it is on a second CD-ROM.

The method 200 advantageously provides flexibility to the manufacturing process by enabling customized configurations for each PC order. The PC manufacturer typically ships the custom manufactured computer system with the preferred operating system within a few days to the customer after receipt of purchase order. Typically, a PC manufacturer may ship several thousand "build-to-order" computer systems every day.

A software program, e.g., a custom device driver, is executable by the computer system 100 to enable swapping of the CD media when the computer system 100 is booted from a CD-ROM 182. The CD-ROM 182 is compliant with the El Torito specification and is configured to emulate a hard disk. In one embodiment, the software program may be written in traditional programming languages such as C. In another embodiment, the software program may be implemented using an object oriented programming language such as C++. The boot device driver program is installed into the boot image that is written to the CD boot sector. An embedded image of a boot operating system, along with the device driver program, is saved on the boot sector of CD-ROM 182. The boot operating system may also be referred to as an embedded operating system. Examples of boot operating system preferably include 32-bit operating systems such as Microsoft Windows NT™, Windows 2000™, Windows XP, and Linux. The ISO 9660 track of the boot CD is not required or used by the software program.

In step 220, the computer system 100 is booted with the boot media, e.g., CD media. The booting process loads and executes the boot operating system. Since the boot operating system is CD media based, the backing store memory is the CD media. The CD media is therefore normally locked to avoid memory page faults.

The process of loading and executing the boot operating system includes a system loader, e.g., Windows NT loader or a Linux loader, loading and executing a kernel, a hardware abstraction layer, and drivers included in the embedded image. The boot operating system kernel, hardware abstraction layer and drivers, including the boot device driver program, are loaded from the CD media into non-paged memory of the computer system 100. The boot device driver program is automatically loaded and executed by the kernel of the boot operating system stored in the non-paged memory.

Figure 2B:
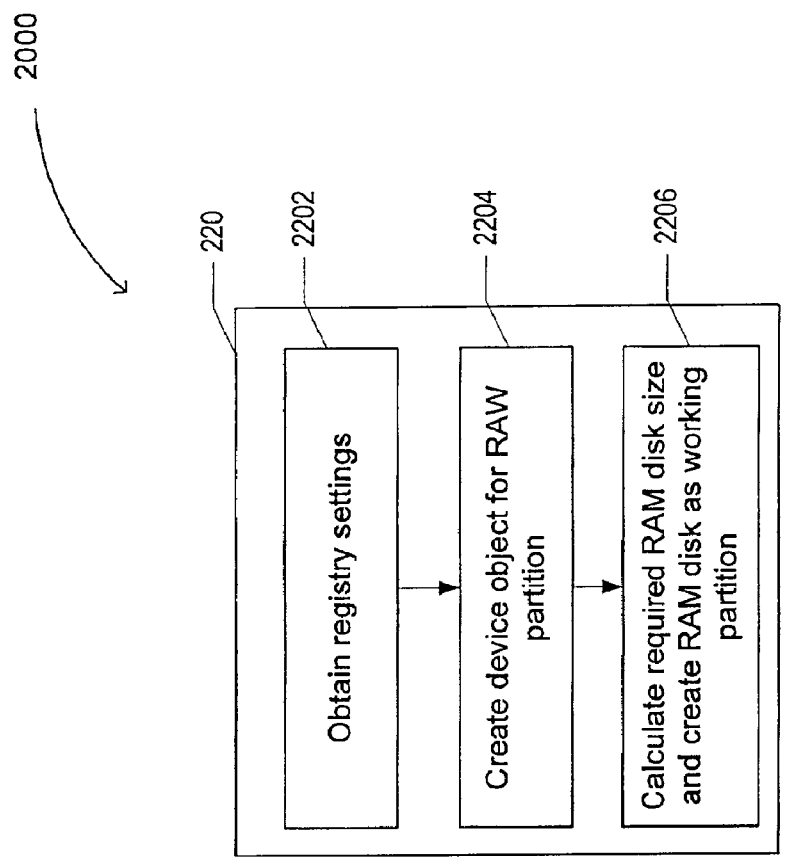
FIG. 2B shows a flow chart of an initialization procedure to configure a RAM disk.

In one embodiment, when the boot device driver program is executed the boot driver program executes an initialization procedure 2000, illustrated in FIG. 2B, to configure a RAM disk. The RAM disk refers to system memory 125 that has been configured to emulate a hard disk drive. Files on a RAM disk can be accessed in a similar manner as accessing files on a physical hard disk 180. Being system memory 125 based, RAM disks are significantly (e.g., 1000×) faster than hard disk drives. RAM disks may be useful for applications that require frequent disk accesses. A RAM disk may also be called a RAM drive. Anything that may be executed from a hard disk drive 180 or floppy disk 185 may be executed from a boot CD-ROM 182.

Referring to FIG. 2B, in step 2202, the boot device driver program queries the boot operating system registry settings to obtain default disk size and the desired drive letter. The boot operating system registry has several hard coded drive letters, typically beginning at drive "C:". Thus a computer system 100 which may include 10 hard disk drives may use drive letters "C:" through "N:" inclusively. A count of the number of CD-ROM drives and the number of fixed disks currently included in the computer system 100 is obtained. The boot device driver program verifies that device\device\CdRom0 is present and identifies the RAM drive as the next hard disk. The CdRom device object, e.g., CdRomDeviceObject, is obtained by using IoGetConfigurationInformation method. Only the first device, e.g., \Device\CdRom0, is supported.

In step 2204, the boot device driver program creates a device object for RAW partition, e.g., not formatted and not partitioned. The device name is \Device\HarddiskN\Partition0, where N is the count of drives obtained in previous call to IoGetConfigurationInformation. The device extension for this device object includes an entry for the CdRom device object. The boot device driver program verifies that there is a CD-ROM disc in the target drive.

In step 2206, the boot device driver program calculates the required size of emulated hard disk based on the size of the boot sector of the boot CD. The device driver configures the RAM disk corresponding to the required size of the emulated hard disk. In another embodiment, the RAM disk memory size may default to a fixed value based on the preferred boot operating system. For example, the boot operating system based on Windows NT or Linux may result in a default RAM disk size of 40 megabytes.

The boot device driver program determines if the geometry can be read from the CD media, including CD-ROM bytes per sector. If the geometry can be read, then the boot record is read along with the El Torito tag information. The catalog sector is read to determine the offset of target image, e.g., its partition boot sector. The partition boot sector is read to determine the disk geometry. The total number of sectors, tracks, and cylinders in the partition, and thus the size of the partition, e.g., the RAM disk, is calculated by the boot device driver program. The number of bytes per sector for CD's is typically 2,048 and not 512.

The boot device driver program creates a device object for the first partition using device name \Device\HarddiskN\Partition1, where N is the count of drives. This partition, which is the RAM disk, is designated as the working partition. The disk count for the computer system 100 is incremented by 1. Memory is allocated from the paged-pool for the RAM disk size specified.

Referring back to FIG. 2A, in step 250, the boot device driver program duplicates or copies the contents of the boot sector included in the removable medium to the RAM disk. The image on the RAM disk is thus identical to the embedded image stored on the boot sector. The boot operating system continues to recognize the CD media as the boot device.

In step 280, the boot device driver program modifies the boot operating system disk/device manager by redirecting the boot device I/O to the RAM disk. In one embodiment, the redirection of boot device I/O is accomplished by modifying the boot operating system, e.g., Windows NT, ARC name and physical disk information tables. An ARC (Advanced RISC Computing) name is a generic method of identifying the location of a file or a program on a device such as a hard disk 180 or a floppy disk 185. A typical ARC name for a boot device may be: multi(0)disk(0)rdisk(1)partition(1). This has a symbolic link to \device\cdrom0 when initially booted to the CD. A symbolic link between the ARC name for the boot device and the name of the device object created, e.g., the RAM disk, is established. Thus, the link is established between multi(0)disk(0)rdisk(1)partition(1), \Device\HarddiskN\Partition1, where N is the count of drives and drive Y. Drive Y denotes a symbolic link for the boot partition and is used for programming convenience.

In redirecting the boot device I/O to the RAM disk the link is changed to \device\harddiskX, where X represents the actual number of the hard disk and which is the device name for the RAM disk. A virtual disk is thus created for %SystemRoot%. Subsequent read and write I/O requests to the boot device are caught in the operating system dispatch routines and redirected to the RAM disk. The boot operating system on the CD media is not used after the boot device driver has been initialized and after the IoAssignArcName( ) call method, which implements the redirecting of boot device I/O, has been executed.

By modifying the boot operating system to redirect boot device I/O to the RAM disk, the backing store memory becomes the RAM disk. The CD media is no longer used as the backing store memory, thereby enabling the removal of the removable medium. In step 285, the removable medium may be optionally removed to load the CD-ROM of a preferred operating system.

Although the method and system of the present disclosure has been described in connection with the preferred embodiment, it is intended to cover such alternatives, modifications, and equivalents, as can be reasonably included within the spirit and scope of the disclosure as defined by the appended claims.

What is claimed is:

1. A method of enabling removal of a removable medium of a boot device included in a computer system when booting a boot operating system, the method comprising:

executing a boot device driver program, the boot device driver program being executed by the boot operating system of the computer system to configure a RAM disk;

copying contents of a boot sector of the removable medium to the RAM disk using the boot device driver program; and modifying the boot operating system using the boot device driver program to redirect the boot media I/O to the RAM disk, the modified boot operating system enabling the removal of the removable medium, and enabling loading of a second removable medium upon removal of the removable medium, the second removable medium including an image of a preferred operating system of the computer system.

2. The method of claim 1, wherein the removable medium is an optical disc.

3. The method of claim 1, wherein memory of the computer system comprises the RAM disk memory allocated to emulate a hard disk.

4. The method of claim 1, wherein the booted boot operating system enables the removable medium to operate as a backing store for the boot operating system, wherein the removable medium is normally locked.

5. The method of claim 1, wherein modifying the boot operating system enables the RAM disk to operate as a backing store for the boot operating system, wherein the removable medium is normally unlocked.

6. The method of claim 1, wherein the boot operating system is a 32-bit operating system.

7. The method of claim 6, wherein the 32-bit operating system is a Microsoft Windows NT™, Windows 2000™, Windows XP™ or Linux.

8. The method of claim 1, wherein the execution of the boot device driver program further comprises:
   determining size of the emulated hard disk defined by the boot sector size; and
   configuring a memory size of the RAM disk prior to the copying of the contents of the boot sector, wherein the configured RAM disk memory size is consistent with the size of the emulated hard disk.

9. The method of claim 1, wherein modifying the boot operating system comprises modifying a device manager included in the boot operating system.

10. The method of claim 9, wherein modifying the device manager comprises modifying values for an ARC name and at least one physical disk information table associated with the boot operating system.

11. The method of claim 1, wherein the contents of the boot sector comprise the boot operating system and the boot device driver program stored as an embedded image.

12. A computer system comprising:
   a processor;
   a memory coupled to the processor, wherein the memory comprises a RAM disk memory allocated to emulate a hard disk;
   a removable medium of a boot device, wherein the boot device is coupled to the processor and the memory, wherein a boot sector of the removable medium comprises an embedded image of a boot operating system; and
   a boot device driver program executable by the boot operating system and enabled to modify the boot operating system to redirect boot devices I/O to the RAM disk, wherein the modified boot operating system enables the removal of the removable medium, and enables loading of a second removable medium upon removal of the removable medium, the second removable medium including an image of a preferred operating system of the computer system.

13. The system of claim 12, wherein the removable medium is an optical disc.

14. The system of claim 12, wherein the memory includes the RAM disk memory allocated to emulate a hard disk.

15. The system of claim 12, wherein the booted boot operating system enables the removable medium to operate as a backing store for the boot operating system, wherein the removable medium is normally locked.

16. The system of claim 12, wherein modifying the boot operating system enables the RAM disk to operate as a backing store for the boot operating system, wherein the removable medium is normally unlocked.

17. The system of claim 12, wherein the boot operating system is a 32-bit operating system.

18. The system of claim 17, wherein the 32-bit operating system is a Microsoft Windows NT™, Windows 2000™, Windows XP™ or Linux.

19. The system of claim 12, wherein the execution of the boot device driver program further comprises:
   determining size of the emulated hard disk defined by the boot sector size; and
   configuring a memory size of the RAM disk prior to the copying of the contents of the boot sector, wherein the configured RAM disk memory size is consistent with the size of the emulated hard disk.

20. The system of claim 12, wherein modifying the boot operating system comprises modifying a device manager included in the boot operating system.

21. The system of claim 20, wherein modifying the device manager comprises modifying values for an ARC name and at least one physical disk information table associated with the boot operating system.

22. The system of claim 12, wherein the contents of the boot sector comprise the boot operating system and the boot device driver program stored as the embedded image.

23. A computer-readable medium having a computer program accessible therefrom, wherein the computer program comprises instructions for:
   executing a boot device driver program, wherein the boot device driver program is executed by a boot operating system, wherein the boot operating system is loaded by the boot device during a boot of a computer system;
   copying contents of a boot sector of a removable medium of the boot device to a RAM disk using the boot device driver program, wherein the boot operating system and the boot device driver program are stored as an embedded image on the boot sector of the removable medium, wherein the RAM disk comprises memory of the computer system allocated to emulate a hard disk; and
   modifying the boot operating system using the boot device driver program to redirect boot media I/O to the RAM disk, wherein the memory based boot operating system enables the removal of the removable medium, and enables loading of a second removable medium upon removal of the removable medium, the second removable medium including an image of a preferred operating system of the computer system.

24. An information handling system comprising:
   a processor;
   an input coupled to the processor;
   a memory coupled to the processor, wherein the memory comprises a RAM disk memory allocated to emulate a hard disk;
   a removable medium of a boot device, wherein the boot device is coupled to the processor and the memory, wherein a boot sector of the removable medium comprises an embedded image of a boot operating system; and
   a boot device driver program executable by the boot operating system and enabled to modify the boot operating system to redirect boot devices I/O to the RAM disk, wherein the modified boot operating system enables the removal of the removable medium, and enables loading of a second removable medium upon removal of the removable medium, the second removable medium including an image of a preferred operating system of the computer system.

* * * * *